(12) United States Patent
Wong et al.

(10) Patent No.: US 10,061,283 B2
(45) Date of Patent: Aug. 28, 2018

(54) SYSTEMS AND METHODS FOR INTEGRATED MICROGRID MANAGEMENT SYSTEM IN ELECTRIC POWER SYSTEMS

(71) Applicant: Opus One Solutions Energy Corp., Richmond Hill (CA)

(72) Inventors: Joshua Wong, Toronto (CA); Cedric Tai, Toronto (CA); Reza Iravani, Toronto (CA); Milan Graovac, Toronto (CA); Xiaolin Wang, Toronto (CA); Subramaniam Harisuthan, Toronto (CA)

(73) Assignee: Opus One Solutions Energy Corp., Richmond Hill (CA)

( * ) Notice: Subject to any disclaimer, the term of this patent is extended or adjusted under 35 U.S.C. 154(b) by 140 days.

(21) Appl. No.: 14/961,326

(22) Filed: Dec. 7, 2015

(65) Prior Publication Data

US 2017/0160711 A1    Jun. 8, 2017

(51) Int. Cl.
  *G05B 19/042*   (2006.01)
(52) U.S. Cl.
  CPC .... *G05B 19/042* (2013.01); *G05B 2219/2639* (2013.01)
(58) Field of Classification Search
  CPC ................. G05B 19/042; G05B 2219/2639
  See application file for complete search history.

(56) References Cited

U.S. PATENT DOCUMENTS

| | | | | |
|---|---|---|---|---|
| 9,514,428 B2* | 12/2016 | Steven | ............. | G06Q 10/06314 |
| 2010/0332373 A1* | 12/2010 | Crabtree | ................ | G06Q 40/04 |
| | | | | 705/37 |
| 2012/0029720 A1* | 2/2012 | Cherian | ................... | H02J 13/00 |
| | | | | 700/297 |
| 2012/0316691 A1* | 12/2012 | Boardman | ................ | H02J 3/26 |
| | | | | 700/293 |
| 2013/0179061 A1* | 7/2013 | Gadh | .................. | B60L 11/1842 |
| | | | | 701/123 |
| 2013/0204443 A1* | 8/2013 | Steven | ................... | G06Q 50/06 |
| | | | | 700/286 |
| 2014/0304025 A1* | 10/2014 | Steven | ............. | G06Q 10/06314 |
| | | | | 705/7.24 |
| 2015/0094968 A1* | 4/2015 | Jia | .......................... | G06Q 40/04 |
| | | | | 702/60 |

* cited by examiner

*Primary Examiner* — Ramesh Patel (74) *Attorney, Agent, or Firm* — Kurtz Firm, PLLC; Richard E. Kurtz (57) ABSTRACT

An integrated microgrid management system includes hardware operating as a node on an electrical power network. The node includes memory storing program code, a communications channel operatively connected to a plurality of controllable power devices, and a processor. In an embodiment, the processor is configured to implement a three-phase AC unbalanced model of a microgrid network, for both low and medium voltage networks. The processor is further configured to implement a topology processor that creates a map identifying controllable power devices that are connected to the network and how said controllable power devices are connected. The processor also implements an online power flow engine that uses the map and the three-phase AC unbalanced model of the network to generate commands to control the plurality of controllable power devices. Adaptive self-configuration logic and an optimization engine that performs multi-objective optimization are further disclosed.

113 Claims, 7 Drawing Sheets

SYSTEMS AND METHODS FOR INTEGRATED MICROGRID MANAGEMENT SYSTEM IN ELECTRIC POWER SYSTEMS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates in general to the field of electric power management and automation systems (EPMAS), including Distribution Management Systems (DMS), Energy Management Systems (EMS), Network Management Systems (NMS) and Distributed Energy Resource Management Systems (DERMS). This application also relates to the subject matter of U.S. patent application Ser. No. 14/480,038 filed Sep. 8, 2014, and U.S. patent application Ser. No. 14/612,013 filed Feb. 2, 2015, the entire disclosures of which are incorporated herein by reference.

BACKGROUND

The introduction and integration of distributed energy resources (DER) into the electric power system (EPS, or "grid") has become a priority in the modern energy era. Distributed energy resources include resources that provide generation (such as photovoltaic, fuel cell, wind, diesel, and natural gas generators), load (such as buildings, homes, and electric vehicles), or storage (such as batteries, flywheels, supercapacitors, and pumped hydroelectric). In particular, the integration of renewable energy sources and electric vehicles onto the grid has many important economic and environmental benefits. Storage is considered as a "missing piece" of the distribution system, performing functions such as peak shaving/valley filling, Volt/VAR optimization, capacity relief, power quality management, buffering the intermittency and variability of supply (e.g. power generation from renewable sources) and demand (e.g. electric vehicle charging or large thermostatic loads), providing backup power, and participating in power system ancillary services.

A microgrid can be defined as a group of interconnected loads and distributed energy resources with clearly defined electrical boundaries that acts as a single controllable entity with respect to the grid and can connect and disconnect from the grid to enable it to operate in both grid-connected or island mode, according to the United States Department of Energy.

Today's microgrid controllers do not generally take into account the overall configuration and operation of the power grid. Their primary purpose is to optimize the operation within the microgrid itself under a fixed electrical boundary without consideration for the external grid. The only consideration of the existing microgrid controllers is not to exceed some fixed limits for current, voltage, and frequency. Some of microgrid controllers are able to accommodate work scheduling, on/off device switching, and outage management. Energy management is usually based on selective activation of a multiplicity of power generation equipment over a predetermined distribution and/or storage to supply a microgrid of electrical power, and automatic, selective disconnect any of power generators from providing power supply to the microgrid. The demand side is managed through conservation and demand response programs and premise (e.g. building, home) management and automation systems. Both of these approaches have little or no significance for distribution system operations. Microgrid controllers typically do not interoperate with the distribution system's DMS, and little value can be attained for the local distribution companies.

Various microgrid controller solutions have been provided in the prior art. The microgrid control system described in US Patent Application No. 20140252855 to Tohru Watanabe, et al. is capable of controlling multiple facilities according to characteristics of the facilities in order to achieve economic efficiency, environmental friendliness, and continued operability. The microgrid control system for controlling the operations of the multiple power facilities is provided with a power supply activation/suspension planning unit that has a prediction unit for predicting outputs or loads of power supply facilities or load facilities and a prediction unit for predicting prediction errors contained therein. It is also provided with an economical load allocation unit that determines command values related to the distribution of loads to be borne by currently running power supply facilities.

In U.S. Patent Application No. 20140297051 to Huaguang Zhang, et al., an energy resource-grid-load automatic control system is presented. The energy resource-grid-load automatic control system comprises a distributed renewable energy power generation module, a distributed renewable energy inverter module, a conventional power generation module, a user load module, a bidirectional grid-connected control module, a distributed renewable energy intelligent optimizing power generation control module, an energy storage module, an intelligent energy storage unit adjuster and a storage battery pack. According to the authors, this controller guarantees the stability and the high energy utilization of the power generation system and effectively solves the problem of non-uniform frequency of use of storage batteries to unify the service life of the storage battery pack.

U.S. Patent Application No. 20130041516 to Uwe Rockenfeller, et al. presents a microgrid controller that may control the generation, distribution, storage and use of electrical power on a microgrid. Embodiments of a microgrid controller may include inputs for different types of power (e.g. AC and DC) or power sources (e.g. wind and solar), an input for utility grid power, electrical equipment for conditioning the electrical power received from the multiple sources (e.g. rectifiers and inverters), outputs to multiple types of loads (e.g. three-phase AC and single-phase AC) and control circuitry designed to control the generation, storage, distribution and usage of electrical power on the microgrid. Embodiments of microgrid systems may include multiple types of electrical generation sources (e.g. wind, solar, electromechanical and fuel cell), multiple types of electrical loads (e.g. inductive and resistive), electrical storage units (e.g. batteries) and a microgrid controller.

In U.S. Patent Application No. 20140300182 to John L. Creed, et al., methods and control apparatus are presented for controlling supply of electrical power to a micro-grid power system, in which a master controller automatically rebalances the micro-grid by activating and deactivating individual power supplies to preferentially activate non-fuel consuming power supplies and deactivate fuel consuming power supplies so as to minimize fuel consumption for the micro-grid power system.

In U.S. Pat. No. 8,682,495 to Michael A. Carralero, et al., a method, apparatus, and computer program product is provided for configuring a microgrid. A first configuration of the microgrid having a set of microgrid elements is initialized. An address for each element in the set of microgrid elements of the microgrid is verified. In response to receiving status data from the set of microgrid elements connected in a peer-to-peer network indicating a reconfiguration of the microgrid, the set of microgrid elements is re-aligned to form a second grid configuration. A second configuration of the microgrid is then executed.

In International PCT Patent Application No. WO2013015773 to Hussam Alatrash, et al., a method, hierarchy, and control architecture for supervisory control of microgrids and their respective energy resources may be provided with the aim of building safe, reliable, and scalable microgrids. Furthermore, the hierarchy and control architecture may be aimed at supporting a host electrical power system stability and while waiving interconnection requirements that challenge system stability.

Although they provide specific microgrid functions, the above-referenced solutions fail to address the issue of the overall power grid optimization. They are generally not designed to contribute reactive power to the grid in order to minimize losses or to improve voltage profile along the distribution feeder. They do not adequately address the issue of significant power swings due to large loads (one-, two- or three-phase) being randomly connected to the microgrid.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to block diagrams and operational illustrations of methods and devices for volt/VAR control in electric power management and automation systems. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

In an embodiment, the invention includes an Integrated Microgrid Management System (IMMS) that provides a control system and framework designed for energy and cost optimization of one or more microgrids, and ensures reliability and resiliency against power outages, while ensuring that the equipment and other restrictions are observed at all times. By providing these functions, the IMMS facilitates the integration of loads with significant power pulses, similar to Electric Vehicle (EV) charging stations and all kinds of DERs. The IMMS is particularly valuable when integration of non-dispatchable DERs (PV or Wind) is required. The optimal use of such resources is challenging due to sudden swings of available power that are not easy to predict and can have detrimental effect on frequency and voltage regulation if not treated properly. In an embodiment, the IMMS uses dispatchable DERs, including the inverter-interfaced storage DERs and dispatchable loads (loads that can be controlled under command that can be equivalent to a source), and an optimized control strategy to mitigate problems introduced by sudden swings of real and reactive power. The IMMS can operate in a stand-alone mode or as a component of an EPS SCADA system, Distributed Energy Management System (DEMS), Distributed Energy Resource Management System (DERMS), Electricity Market or the like. When it operates within a DEMS or DERMS, the IMMS can provide the functionality of an Intelligent Node (IN). When it operates as a stand-alone device, the IMMS and the device it is implemented on can control either a grid-connected or a standalone microgrid.

The IMMS described below is preferably designed so that the microgrid is not only locally optimized but can contribute to the overall power grid optimization. In an embodiment, the IMMS can allow sharing of computing resources between controllers within a DEMS or DERMS and is meant to be a component in a distributed intelligence (DI) for managing the EPS.

Below, we first describe a complete microgrid configuration. On this configuration basis, five typical tiers of microgrids are then described: sub-premise, premise, community/sub-feeder, feeder and substation. And then, the real time reconfiguration of microgrid systems is explained. The secondary network is introduced in the microgrid systems. Finally, the Integrated Microgrid Management System (IMMS) is described.

Figure 1:
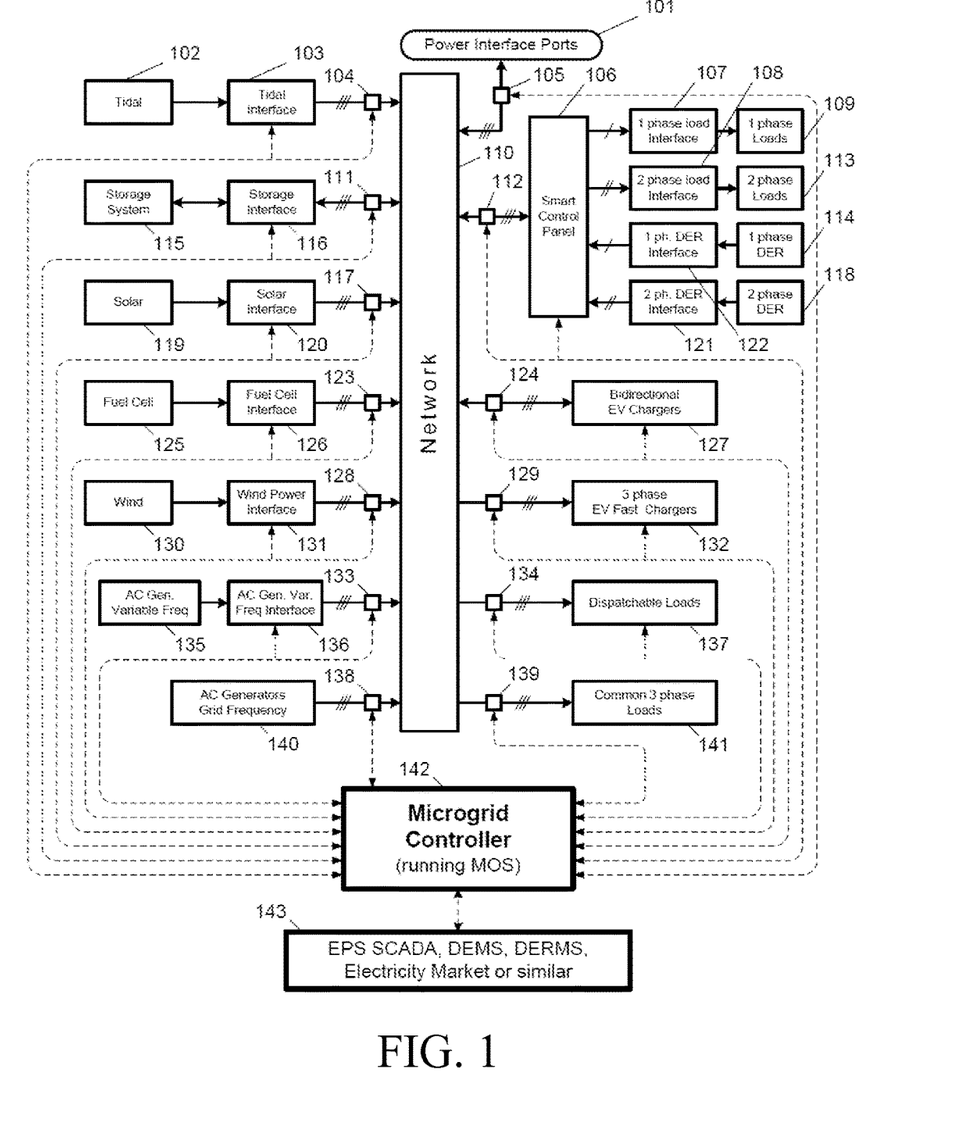
FIG. 1 is a schematic diagram illustrating an embodiment of the microgrid configuration.

FIG. 1 shows a schematic diagram illustrating the general layout of a microgrid that the present IMMS is designed to control. The microgrid may consist of a number of DERs, three-phase EV fast chargers, bidirectional EV chargers, conventional three-phase loads and a host of single- and two-phase loads connected to the microgrid via Smart Control Panel. The microgrid may have one or more storage system DER units, and any number of Solar, Wind, Fuel Cell, AC variable speed and AC grid frequency DERs. Special kinds of DERs are dispatchable loads.

In an embodiment, the IMMS controller presented in this document can maintain real and reactive power balance within the microgrid for voltage and frequency stability by managing dispatchable and non-dispatchable generation, storage, and load resources. The IMMS can also manage constraints such as resource availability, ramp rates, and current limits. The IMMS can manage grid-connected and grid-islanded states to connect or disconnect the microgrid from the main grid based on factors including price points and availability of the main grid. Within a certain mode the IMMS can optimize the operation of the microgrid such as according to cost, environmental, reliability or convenience objectives.

The microgrid shown in FIG. 1 may be connected to the EPS via a current constrained tie. The IMMS controller can provide a microgrid with capability to handle significant random high-power loads (e.g. multiple EV chargers or large compressors), without exceeding constraints using microgrid DERs. At the same time, the IMMS can accommodate random power output from renewable DERs and enables DEMS (or DERMS) to utilize reactive power capacity of all interface inverters to assist in optimal operation of EPS. To enable microgrid optimization, single- and two-phase loads can be connected via a smart panel that enables switching loads between phases. Based on an IMMS command, a smart panel can provide phase balancing as well as load shedding and load cycling (e.g., to ensure optimal charging of multiple EVs that are connected vial level 2 chargers). The IMMS enables easy integration of grid components such as DER controllers, sensors, metering collectors, switch controllers, and substation intelligent electronic devices (IED) to provide full intelligent node (IN) functionality.

By default, all inverters follow the voltage and frequency specified by the grid. Based on measurements and results of the power flow, the IMMS determines optimal operating points for each source and sends individual set-points to all units. When all loads cannot be accommodated with available power, intelligent load shedding is implemented. If needed, the IMMS has the ability to activate a Frequency vs. Active Power and Voltage vs. Reactive Power droop control mode. This is particularly important if the power produced in the microgrid represent a significant contribution to the overall power produced in EPS. In such case the microgrid has the ability to operate as a Virtual Power Plant (VPP) and utilities may impose specific rules for connection.

The IMMS accommodates advanced EV charging by utilizing local DERs and relies on battery storage to provide pre-specified power ramp rate and ensures that grid tie maximum power is not exceeded. Since most of EV charging is controlled by electric vehicles it may result in significant load power pulses. IMMS ensures that these pulses are maintained within the predefined range. If bidirectional EV chargers are installed, which can inject power from the vehicle's battery back into the grid, the IMMS can utilize the available EV batteries to improve the operation of the grid.

The IMMS provides support for global volt VAR optimization (VVO). Each one of converter-based DERs can provide reactive power on request as long as the maximum tie-line current is not exceeded.

In an embodiment, operations for the DEMS or DERMS are carried out on at least one Intelligent Node (IN) which acts as the brains of the grid and runs the IMMS software. Each IN consists of a hardware and software platform, with data/information processing (e.g. intelligence, decision making) and communications (e.g. networking, protocol conversion, local and wide area) capabilities. A microgrid controlled by the IN can be designed to operate in a grid-connected mode with occasional islanded operation.

In an embodiment, the IMMS-controlled microgrid operates in one of the following modes: Grid-supported mode, VPP mode, or Islanded mode.

In Grid-supported mode, the microgrid operates as a four-quadrant (positive and negative voltage and current) device with imposed current limit at the point of connection. It is expected that the balance of power is provided by the grid.

In VPP mode, the microgrid is able to control voltage at the point of connection. It can inject required active and reactive power, as well as P and Q droop based on frequency and voltage.

In Islanded mode, the IMMS controller is capable of providing stable voltage and frequency while dynamically balancing available generation, storage and loads. Load shedding based on predetermined criteria is available. Supply of critical loads can be maintained for extended periods of time.

In an embodiment, the IMMS controller described herein is capable of dynamic transfer between modes of operation. It is able to recognize a blackout signature and initiate islanded mode before the supply to critical loads is interrupted. The IMMS can also support adaptive self-configuration. A microgrid typically contains a number of DGs, loads and other microgrids. As a response to grid events, one set of microgrids can be reconfigured into various microgrids, including embedded microgrids.

With continued reference to FIG. 1, the network in the middle of the figure represents the main power circuit of the microgrid. Through breakers, the network nodes are connected to different distributed energy sources and loads. Each breaker in the microgrid is associated with an Intelligent Node.

On the left hand side of the Network are the distributed energy sources. It includes Tidal, Storage system, Solar, Fuel cell, Wind, AC Gen. Variable frequency, and AC Generator grid frequency. In all types of the distributed energy sources, AC Generator grid frequency only is directly connected to the Network. Other sources have its own interface to be connected to the network because its frequency is variable.

On the right hand side of the Network are the loads and single and two phases distributed energy sources. A smart control panel is set to control and manage the unbalanced loads and single and two phases distributed energy sources.

The top, Power Interface Ports, represents all the connections to the electrical power system.

The second from bottom, Microgrid Controller (consisting of one or more intelligent nodes, all running IMMS), is the controller of the microgrid. It is in charge of the control and power management of the microgrid.

The bottom, EPS SCADA, DEMS, DERMS, Electricity Market or similar, is the utility's control center. The Microgrid Controller will receive commands and related information.

Power Interface Ports 101 represents the electrical power system and through a breaker 105 (intelligent node) connect to the microgrid Network 110, which may include one or more points of connection. Network 110 is the main power circuit of the microgrid. Tidal power source 102 through Tidal Interface 103 and the breaker 104 is connected to the Network. Storage System 115 through Storage Interface 116 and the breaker 111 is connected to the Network. Solar power source 119 through Solar Interface 120 and the breaker 117 is connected to the Network. Fuel Cell source 125 through Fuel Cell Interface 126 and the breaker 123 is connected to the Network. Wind power source 130 through Wind power Interface 131 and the breaker 128 is connected to the Network. AC Gen. Variable frequency source 135 through AC Gen. Variable frequency Interface 136 and the breaker 133 is connected to the Network. AC Generator grid frequency source 140 through the breaker 138 is connected to the Network.

Smart Control Panel 112 is connected through the breaker 112 to the Network, through one-phase load interface 107 is connected to one-phase loads 109, through two-phase load interface 108 is connected to two-phase loads 113, through one-phase DER interface 122 is connected to one-phase DER 114, and through two-phase DER interface 121 is connected to two-phase DER 118.

Bidirectional EV Chargers 127 is connected through the breaker 124 to the Network. Three-phase EV Fast Chargers 132 are connected through the breaker 129 to the Network. Dispatchable Loads 137 are connected through the breaker 134 to the Network. Common three-phase Loads 141 are connected through the breaker 139 to the Network.

In an embodiment, Microgrid Controller (142) consists of one or more intelligent nodes and is responsible for the control and power management of the microgrid. Every controllable power device and intelligent node in the microgrid communicates and exchanges information with the Microgrid Controller 142.

EPS SCADA, DEMS, DERMS, Electricity Market or similar controller 143 is the utility's control central. It communicates with the Microgrid Controller 142 and exchanges information.

Figure 2:
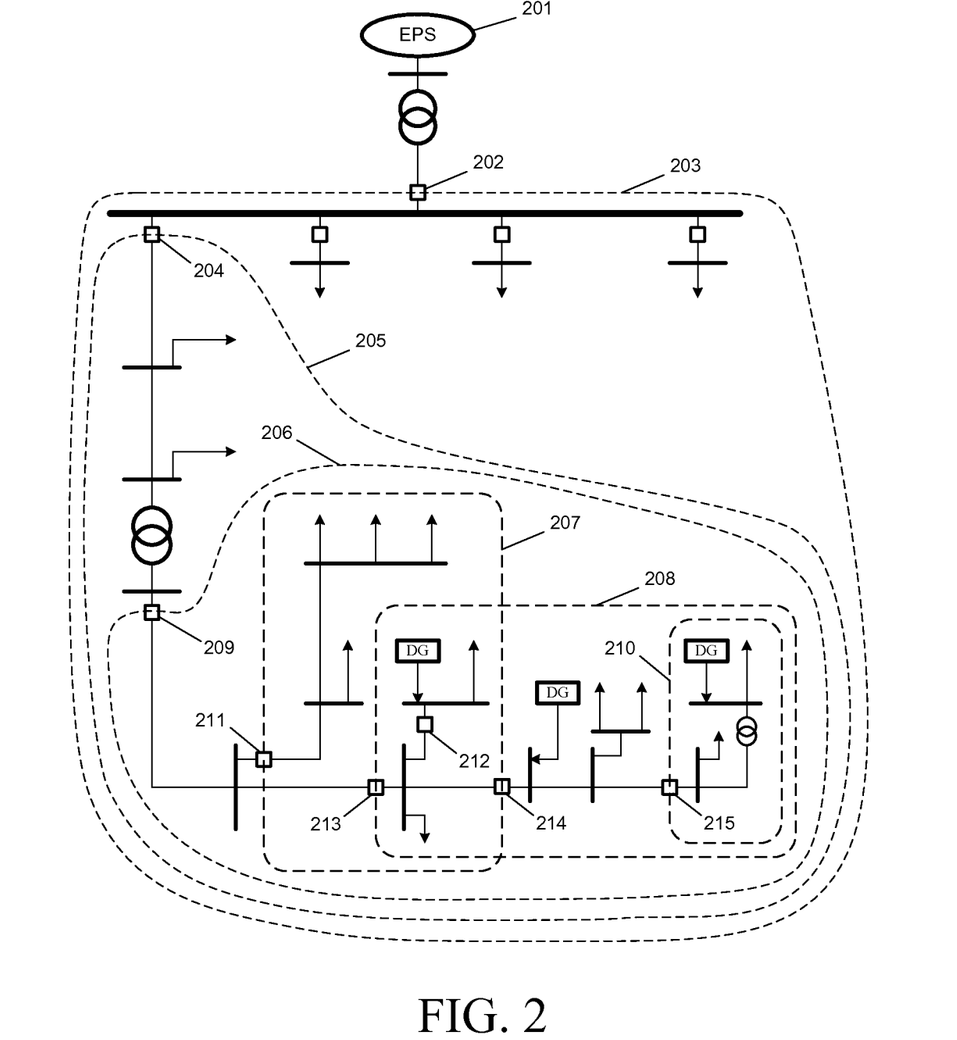
FIG. 2 is a schematic diagram illustrating typical tiers of microgrid systems.

The five typical tiers of microgrid systems are shown in FIG. 2. This figure illustrates the scalable multi-tiered architecture of microgrid systems. Each breaker in a microgrid is an Intelligent Node.

The descriptions of components are as follows:
a. Tier 1: Dotted line 210 represents a sub-customer microgrid, defined as one or more circuits inside a customer premise behind a utility meter. In this instance, the sub-customer microgrid is connected to the main grid through breaker 215 controlled via an intelligent node running IMMS.
b. Tier 2: Dotted line 208 represents a customer, defined as the complete set of circuits behind a utility meter. In this instance the customer microgrid is connected to the main grid through a breaker 213. 208 further has an embedded microgrid 210. Through the breakers 212, 214, and 215, the microgrid 208 can be reconfigured.
c. Tier 3: Dotted line 207 represents a type of sub-feeder or community microgrid, defined as consisting of a number of utility customers but not the entire feeder. In this instance the microgrid is connected through two breakers 211 and 214 to the main grid. Through the breakers 211 and 213, the microgrid 207 can be reconfigured. The other feature of microgrid 207 and microgrid 208 is with a common part of the system. It shows the microgrid has an overlapping feature.
d. Dotted line 206 represents another type of sub-feeder or community microgrids. In this instance the microgrid is connected through a breaker 209 to the main grid. In microgrid 206, the microgrid 207, 208, and 210 are embedded. And also, microgrid 206 can be reconfigured through breakers 211, 212, 213, 214, and 215.
e. Tier 4: Dotted line 205 represents a type of feeder based microgrid, defined as consisting of all customers possibly fed by a single utility distribution feeder. In this instance the microgrid is connected through a breaker 204 to the main grid. Similar to microgrid 206, microgrid 205 also has embedded microgrids and can be reconfigured through internal breakers.
f. Tier 5: Dotted line 203 represents a type of substation based microgrid, defined as consisting of all customers possibly fed by a single utility distribution substation. In this instance the microgrid is connected through a breaker 202 to the main grid. Similar to microgrid 205, microgrid 203 also has embedded microgrids and can be reconfigured through internal breakers.

Electrical Power System (EPS) 201 feeds the substation through the breaker 202.

Figure 3:
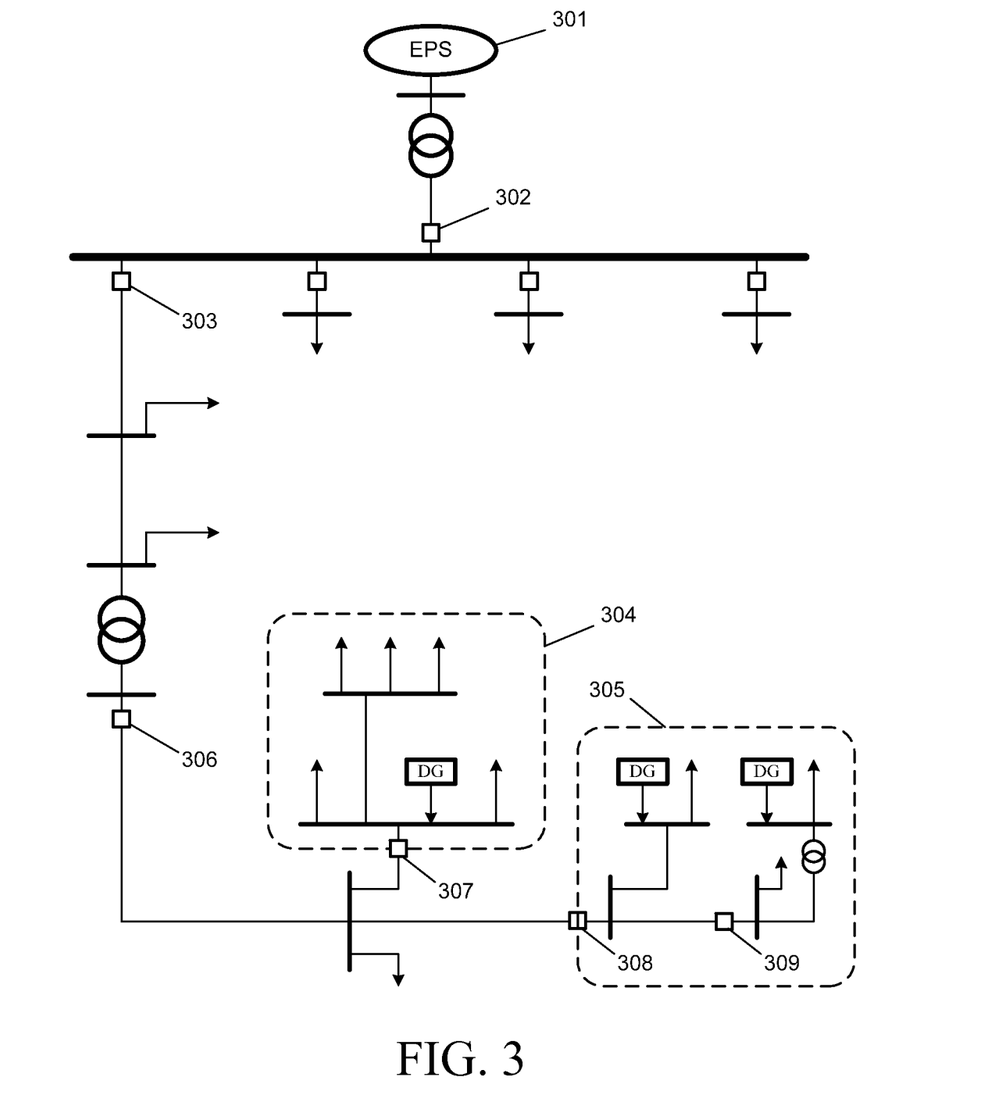
FIG. 3 is a schematic diagram illustrating a base case of reconfiguration concepts of microgrid systems.

FIG. 3 shows a base case of real time reconfiguration of microgrid systems. Then, on this basis, FIGS. 4 and 5 (discussed further below) show details of the microgrid reconfiguration concept. In FIG. 3, EPS 301 feeds the substation through the breaker 302. Breakers 303 and 306 are breakers in the sample feeder that can be used to section the feeder. Dotted line 304 represents a microgrid in the feeder and through a breaker 307 is connected to the grid. Dotted line 305 represents the second microgrid in the feeder and through a breaker 308 is connected to the grid. Microgrid 305 can be reconfigured through the breaker 309.

Figure 4:
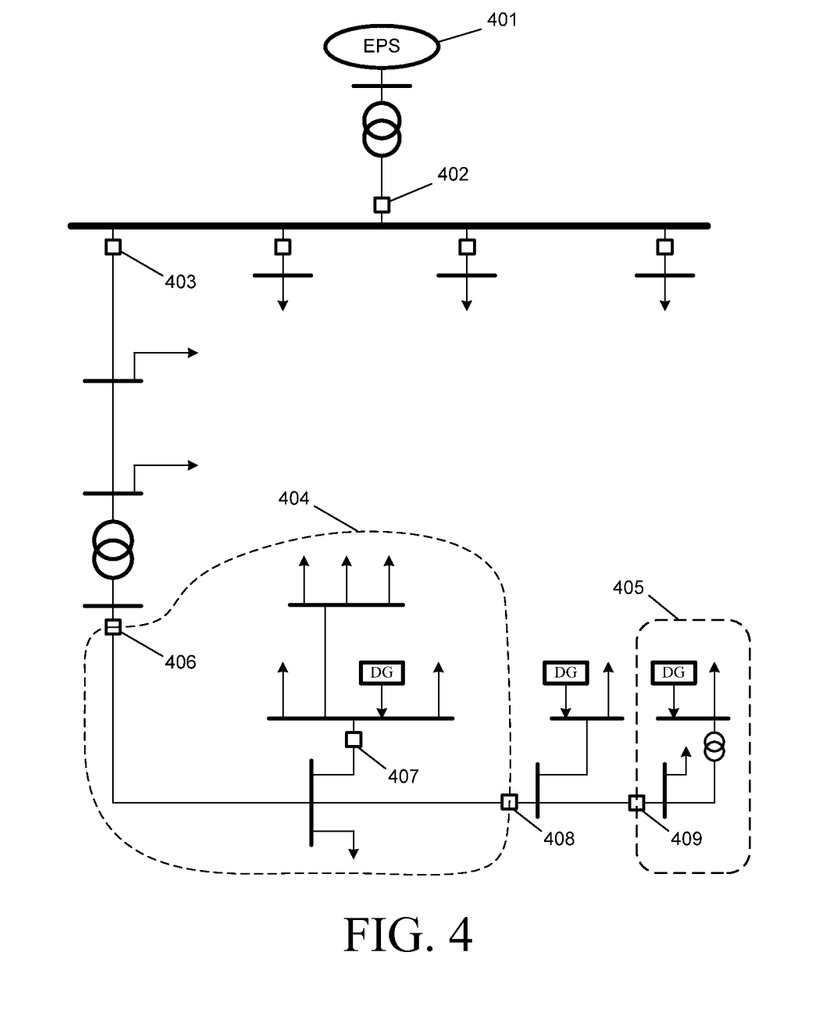
FIG. 4 is a schematic diagram illustrating a second case of reconfiguration concepts of microgrid systems.

FIG. 4 illustrates further the real-time reconfiguration concepts presented above. EPS 401 feeds the substation through the breaker 402. Breakers 403 and 406 are breakers in the sample feeder to be used to section the feeder. Dotted line 404 represents a microgrid in the feeder and through breakers 406 and 408 are connected to the grid. 404 is from reconfiguration of microgrid 304 in FIG. 3. Dotted line 405 represents the second microgrid in the feeder and through a breaker 309 is connected to the grid. 405 is from reconfiguration of microgrid 305 in FIG. 3.

Figure 5:
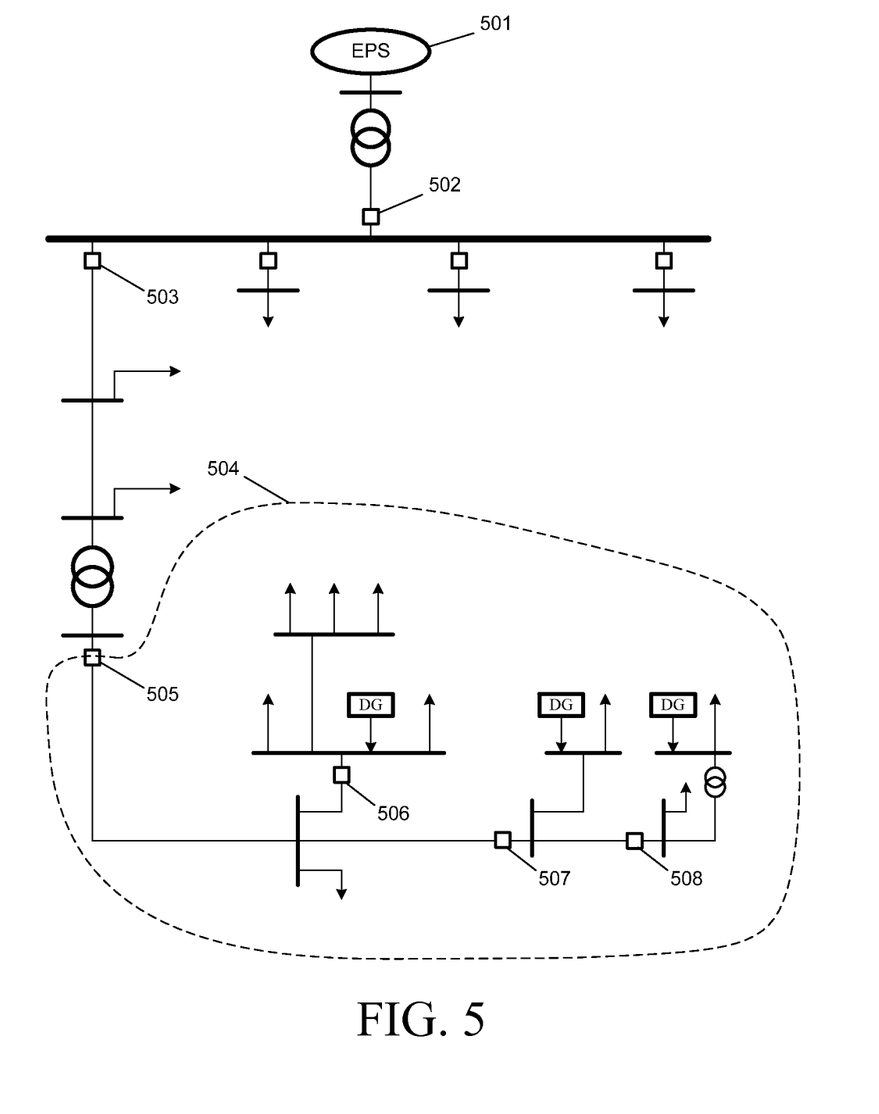
FIG. 5 is a schematic diagram illustrating a third case of reconfiguration concepts of microgrid systems.

FIG. 5 further illustrates the above-described real-time reconfiguration concepts of microgrid systems. EPS 501 feeds the substation through the breaker 502. Feeder breaker 503 is a breaker in the sample feeder and can be used to connect the feeder to the substation. Dotted line 504 represents the microgrid in the feeder and through breaker 505 is connected to the grid. 504 is from the reconfiguration of microgrid 404 and 405 in FIG. 4. 504 can be reconfigured through breakers 506, 507, and 508.

Figure 6:
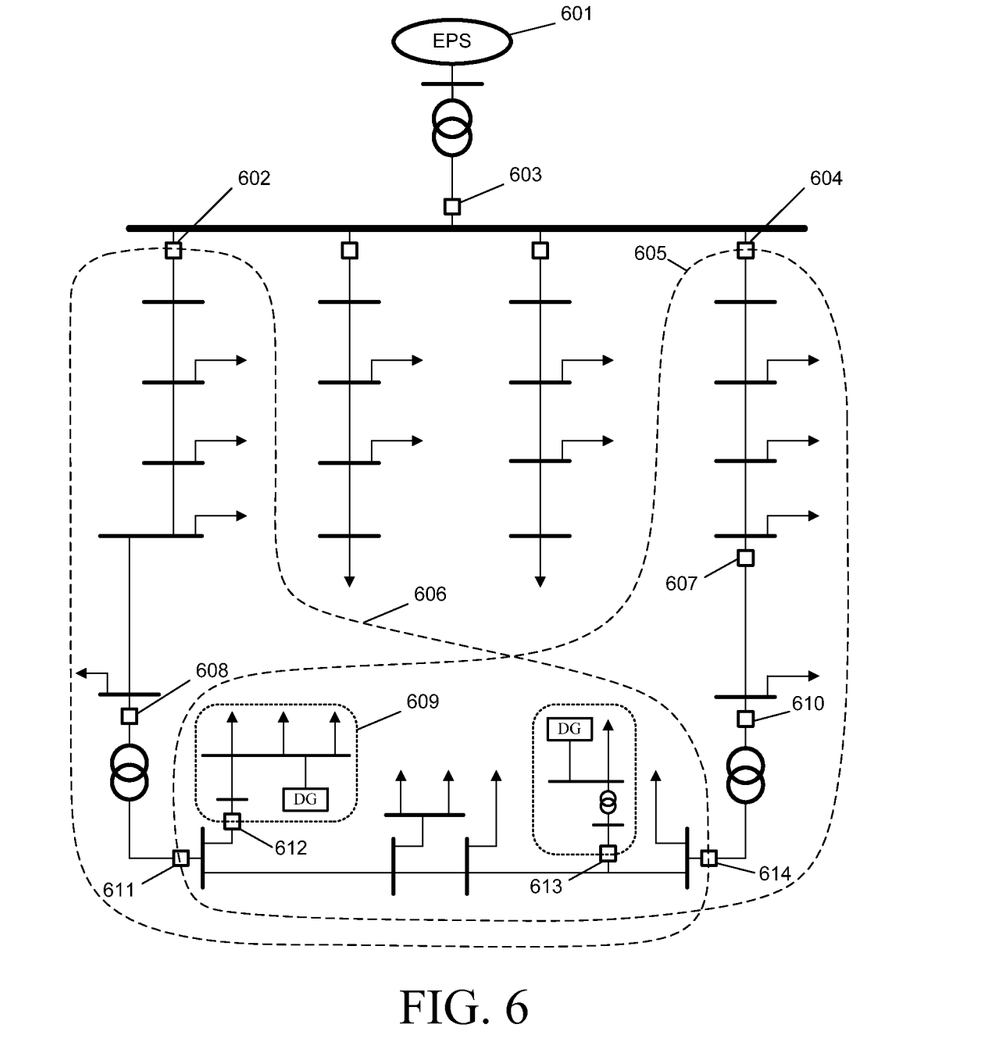
FIG. 6 is a schematic diagram illustrating basic schematic of microgrid systems with a secondary network.

The microgrid can be maintained in a variety of feeder configurations, such as radial, dual radial, open loop, closed loop (mesh), and secondary networks. A basic schematic of microgrid systems with a secondary network is shown in FIG. 6. The secondary network are connected to two feeders through breakers 611 and 614. In the secondary network, there are two independent microgrids. Dot line 609 is connected to the secondary network through breaker 612 and the other is connected to the secondary network through breaker 613. Based on the system conditions, the secondary network can be included in the microgrid 605 (right hand side feeder) or the left hand side microgrid.

With continued reference to FIG. 6, EPS 601 represents the Electrical Power System and through the breaker 603 feeds the substation. Dotted line 605 represents the microgrid of the feeder at the right hand side which is connected to substation through breaker 604. This microgrid can be reconfigured through breakers 607, 610 614, 613, 612, and 611. Dotted line on the left hand side feeder represents the other microgrid which is connected to substation through breaker 602. This microgrid can be reconfigured through breakers 608, 611 612, 613, and 614.

Figure 7:
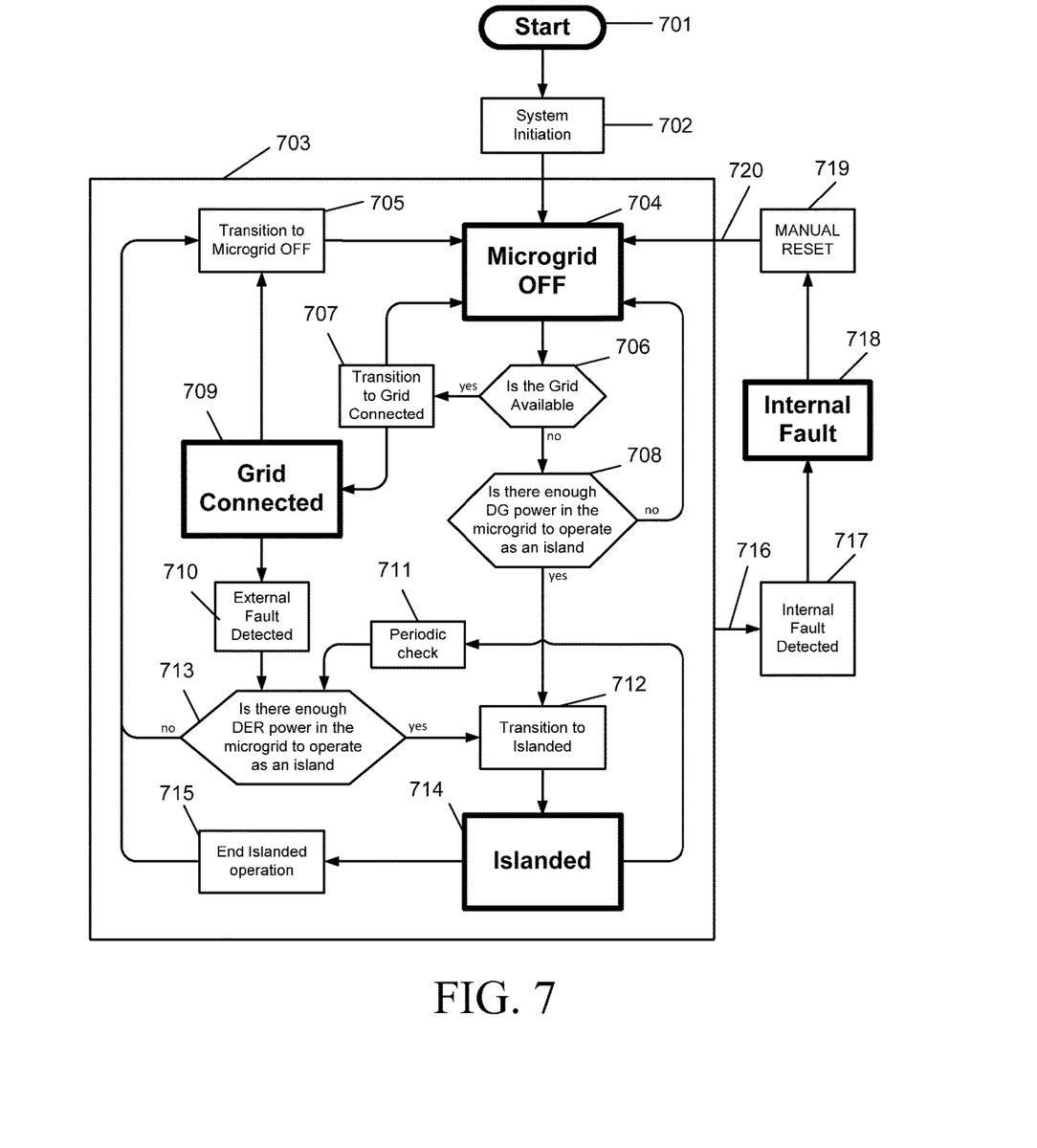
FIG. 7 is a state diagram illustrating an IMMS controller process flow.

A method of controlling microgrids is described in the state machine presented in FIG. 7. Reference no. 701 represents the command to start the micro-grid controller and the micro-grid. Reference no. 702 represents the initialization process of the micro-grid controller. Dotted line 703 on the left hand side represents the internal control of the micro-grid controller. Reference no. 704 represents that the micro-grid is at off status. Reference no. 705 represents the transition to the micro-grid off status. Reference no. 706 represents the process checking the availability of the grid. Reference no. 707 represents the transition to the grid connected mode or to off status. Reference no. 708 represents the process checking the DG power to run the microgrid at islanded mode. Reference no. 709 represents the micro-grid running at grid connected mode. Reference no. 710 represents the external fault detection function. Reference no. 711 represents the regular process checking the DG power for the islanded mode. Reference no. 712 represents the transition to the Islanded mode. Reference no. 713 represents the process checking the DG power to run an islanded mode. Reference no. 714 represents the micro-grid running in islanded mode. Reference no. 715 represents the process ending the islanded mode. Reference no. 716 represents the outputs from internal controller. Reference no. 717 represents the internal fault detection function. Reference no. 718 represents that the microgrid is at internal fault. Reference no. 719 represents the manual operator. Reference no. 720 represents the commands from manual operator to the internal controller.

The above-described Integrated Microgrid Management System (IMMS) provides a novel and advantageous approach in a number of ways, some of which are described below.

Microgrid Platform Services

The IMMS can be architected as a "core" set of functions composed of:

a. a library of engineering models of energy resources, including generation, storage, and demand resources, such as solar, wind, diesel, battery, flywheel, fuel cell, hydro and electric vehicles;

b. a three-phase AC unbalanced engineering model of the microgrid network, including low voltage and medium voltage networks, such as underground cables, overhead wires, transformers, switches, fuses, reclosers, voltage regulators, capacitors, elbows and terminators;

c. a topology processor of what resources are connected to the network and how they are connected;

d. a forecasting engine for generation (supply), storage and loads (demand);

e. an online power flow engine, using the three-phase AC unbalanced model of the network, for both low and medium voltage networks;

f. a state estimator, to compute system states such as voltages, currents, power, frequency, and angles, for the online power flow engine;

g. an optimization engine, running optimization algorithms such as non-linear programming (NLP), for multi-objective, multi-constraint, and multi-agent optimization, where the concept of Pareto fronts is used for multi-objective optimization and the concept of Correlated equilibrium (including Nash equilibrium as a specific case) is used for multi-agent optimization.

The IMMS can be configured by defining a number of available energy resources from the library and their point of connection onto the microgrid network engineering model, to build up the model. There is no limitation to the number of available energy resources, and that the IMMS can be expanded and scaled in both energy resources and microgrid network.

In an embodiment, on top of the above-described core is a library of applications for various modes of operation, which include Grid-islanded mode and Grid-connected mode. In Grid-islanded mode, the microgrid is self-sufficient with by managing embedded dispatchable and non-dispatchable generation, storage, and load resources, which can maintain real and reactive power balance within the microgrid for voltage and frequency stability. In Grid-connected mode, the microgrid is connected to the larger electric power system, and is reliant on it to maintain real and reactive power balance within the microgrid for voltage and frequency stability. In this mode the microgrid can balance its supply, demand and storage resources to meet optimization objectives including cost, environmental impact, reliability and convenience. The IMMS can manage the transition between these two modes.

Intelligent Node Network Driven

In accordance with an embodiment, a method is provided for controlling the microgrid through an Integrated Microgrid Management System (IMMS) embedded into one or more controllers as Intelligent Nodes. Such intelligent nodes can be physical and local to the microgrid, or virtualized as software controls outside the physical premise of the microgrid, such as a remote supervisory management system.

Multiple microgrids, whether they are at different tiers or overlapping, can be coordinated via a network of IMMS controllers, connected via a communications system.

Integrated Multi-Tiered Optimization

The operation of the microgrid, including balancing its supply, storage and demand resources to meet various objectives, does not only take into consideration its own internal objectives within a fixed electrical boundary, but how it interfaces with upstream, downstream, adjacent or overlapping systems, including other microgrids.

Five typical tiers of microgrids include sub-premise, premise, community/sub-feeder, distribution feeder, and substation tiers. Premise can include residential, commercial and industrial customers.

A microgrid is hence a "grid-of-grids", such that that IMMS can be run with multiple instances at different tiers, and be able to interoperate.

Adaptive Self-Configuration

In an embodiment, the boundaries of the microgrid are not fixed. Under certain criteria such as defined by thresholds, events such as faults, or optimization parameters, the microgrid can be reconfigured into various configurations. Forms of reconfiguration include formulating different tiers, embedded, and overlapping microgrids.

Control of microgrid boundaries can be dynamic, and can adjust/adapt to various grid and microgrid operating conditions. Microgrid configuration can operate over various distribution network topologies, including radial, dual radial, open loop, closed loop (mesh), and secondary networks.

Aggregation

The operation of multiple microgrids can be coordinated via the above-described intelligent node network, and their energy resource capacities aggregated and controlled by a highest-tier IMMS which embeds all the IMMS's in consideration.

Such coordinated operations and aggregated capabilities are commonly referred as a Virtual Power Plant (VPP) or the Energy Cloud.

Hardware

At least some aspects disclosed above can be embodied, at least in part, in software. That is, the techniques may be carried out in a special purpose or general purpose computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A non-transient machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques described above. Thus, the techniques are neither limited to any specific combination of hardware circuitry and software nor to any particular source for the instructions executed by the data processing system.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. An integrated microgrid management system, comprising:
    a. hardware operating as a node on an electrical power network, the node comprising:
        memory storing program code;
        a communications channel operatively connected to a plurality of controllable power devices;
        a physical processor configured to:
            implement a three-phase AC unbalanced model of a microgrid network, for both low and medium voltage networks;
            implement a topology processor that creates a map identifying controllable power devices that are connected to the network and how said controllable power devices are connected; and,
            implement an online power flow engine that uses the map and the three-phase AC unbalanced model of the network to generate commands to control the plurality of controllable power devices.

2. The integrated microgrid management system according to claim 1, wherein the communications channel is further operatively connected to one or more other integrated microgrid management systems.

3. The integrated microgrid management system according to claim 1, wherein the processor is further configured to utilize a library of engineering models of energy resources.

4. The integrated microgrid management system according to claim 3, wherein the energy resources comprise generation resources.

5. The integrated microgrid management system according to claim 4, wherein the generation resources comprise at least one selected from the set consisting of: tidal, solar, hydroelectric, fuel cell, wind, and A/C generator.

6. The integrated microgrid management system according to claim 3, wherein the energy resources comprise storage resources.

7. The integrated microgrid management system according to claim 6, wherein the storage resources comprise at least one selected from the set consisting of: battery, flywheel, fuel cell.

8. The integrated microgrid management system according to claim 3, wherein the energy resources comprise demand resources.

9. The integrated microgrid management system according to claim 6, wherein the demand resources comprise at least one selected from the set consisting of: electric vehicle, other dispatchable load.

10. The integrated microgrid management system according to claim 1, wherein the processor is further configured to implement a state estimator that computes system states.

11. The integrated microgrid management system according to claim 10, wherein the system states comprise at least one state selected from the set consisting of: voltages, currents, power, frequency and angles.

12. The integrated microgrid management system according to claim 1, wherein the processor is further configured to use dispatchable distributed energy resources and an optimized control strategy to mitigate problems introduced by swings of real and reactive power.

13. The integrated microgrid management system according to claim 1, wherein the hardware operating as a node on the electrical power network comprises an electrical power SCADA system.

14. The integrated microgrid management system according to claim 1, wherein the hardware operating as a node on the electrical power network comprises a distributed energy management system.

15. The integrated microgrid management system according to claim 1, wherein the hardware operating as a node on the electrical power network comprises a distributed energy resource management system.

16. The integrated microgrid management system according to claim 1, wherein the microgrid is a grid-connected microgrid.

17. The integrated microgrid management system according to claim 1, wherein the microgrid is an islanded or standalone microgrid.

18. The integrated microgrid management system according to claim 1, wherein the processor is further configured to maintain real and reactive power balance within the microgrid for voltage and frequency stability by managing dispatchable and non-dispatchable generation, storage, and load resources.

19. The integrated microgrid management system according to claim 1, wherein the processor is further configured to utilize a library of applications corresponding to a plurality of different modes of microgrid operation.

20. The integrated microgrid management system according to claim 19, wherein the plurality of different modes of microgrid operation comprise Grid-islanded mode and Grid-connected mode.

21. The integrated microgrid management system according to claim 1, wherein the processor is further configured to manage grid-connected and grid-islanded states to connect or disconnect the microgrid from a main grid based on factors including price points and availability of the main grid.

22. An integrated microgrid management system, comprising:

b. hardware operating as a node on an electrical power network, the node comprising:
     memory storing program code;
     a communications channel operatively connected to a plurality of controllable power devices;
     a physical processor configured to:
       implement an optimization engine that performs multi-objective, multi-constraint, and multi-agent optimization, said optimization engine utilizing Pareto fronts to perform multi-objective optimization; and,
       implement an online power flow engine that uses the output of the optimization engine to generate commands to control the plurality of controllable power devices.

23. The integrated microgrid management system according to claim 22, wherein the processor is further configured to utilize a library of engineering models of energy resources.

24. The integrated microgrid management system according to claim 23, wherein the energy resources comprise generation resources.

25. The integrated microgrid management system according to claim 24, wherein the generation resources comprise at least one selected from the set consisting of: tidal, solar, hydroelectric, fuel cell, wind, and A/C generator.

26. The integrated microgrid management system according to claim 23, wherein the energy resources comprise storage resources.

27. The integrated microgrid management system according to claim 26, wherein the storage resources comprise at least one selected from the set consisting of: battery, flywheel, fuel cell.

28. The integrated microgrid management system according to claim 23, wherein the energy resources comprise demand resources.

29. The integrated microgrid management system according to claim 28, wherein the demand resources comprise at least one selected from the set consisting of: electric vehicle, other dispatchable load.

30. The integrated microgrid management system according to claim 22, wherein the processor is further configured to implement a state estimator that computes system states.

31. The integrated microgrid management system according to claim 30, wherein the system states comprise at least one state selected from the set consisting of: voltages, currents, power, frequency and angles.

32. The integrated microgrid management system according to claim 22, wherein the processor is further configured to use dispatchable distributed energy resources and an optimized control strategy to mitigate problems introduced by swings of real and reactive power.

33. The integrated microgrid management system according to claim 22, wherein the hardware operating as a node on the electrical power network comprises an electrical power SCADA system.

34. The integrated microgrid management system according to claim 22, wherein the hardware operating as a node on the electrical power network comprises a distributed energy management system.

35. The integrated microgrid management system according to claim 22, wherein the hardware operating as a node on the electrical power network comprises a distributed energy resource management system.

36. The integrated microgrid management system according to claim 22, wherein the microgrid is a grid-connected microgrid.

37. The integrated microgrid management system according to claim 22, wherein the microgrid is a standalone microgrid.

38. The integrated microgrid management system according to claim 22, wherein the processor is further configured to maintain real and reactive power balance within the microgrid for voltage and frequency stability by managing dispatchable and non-dispatchable generation, storage, and load resources.

39. The integrated microgrid management system according to claim 22, wherein the processor is further configured to utilize a library of applications corresponding to a plurality of different modes of microgrid operation.

40. The integrated microgrid management system according to claim 39, wherein the plurality of different modes of microgrid operation comprise Grid-islanded mode and Grid-connected mode.

41. The integrated microgrid management system according to claim 22, wherein the processor is further configured to manage grid-connected and grid-islanded states to connect or disconnect the microgrid from a main grid based on factors including price points and availability of the main grid.

42. An integrated microgrid management system, comprising:
hardware operating as a node on an electrical power network, the node comprising:
memory storing program code;
a communications channel operatively connected to a plurality of controllable power devices;
a physical processor configured to:
implement an optimization engine that performs multi-objective, multi-constraint, and multi-agent optimization, said optimization engine utilizing correlated equilibrium to perform multi-agent optimization; and,
implement an online power flow engine that uses the output of the optimization engine to generate commands to control the plurality of controllable power devices.

43. The integrated microgrid management system according to claim 42, wherein the correlated equilibrium comprises Nash equilibrium.

44. The integrated microgrid management system according to claim 42, wherein the processor is further configured to utilize a library of engineering models of energy resources.

45. The integrated microgrid management system according to claim 44, wherein the energy resources comprise generation resources.

46. The integrated microgrid management system according to claim 45, wherein the generation resources comprise at least one selected from the set consisting of: tidal, solar, hydroelectric, fuel cell, wind, and A/C generator.

47. The integrated microgrid management system according to claim 42, wherein the energy resources comprise storage resources.

48. The integrated microgrid management system according to claim 47, wherein the storage resources comprise at least one selected from the set consisting of: battery, flywheel, fuel cell.

49. The integrated microgrid management system according to claim 42, wherein the energy resources comprise demand resources.

50. The integrated microgrid management system according to claim 49, wherein the demand resources comprise at least one selected from the set consisting of: electric vehicle, other dispatchable load.

51. The integrated microgrid management system according to claim 42, wherein the processor is further configured to implement a state estimator that computes system states.

52. The integrated microgrid management system according to claim 51, wherein the system states comprise at least one state selected from the set consisting of: voltages, currents, power, frequency and angles.

53. The integrated microgrid management system according to claim 42, wherein the processor is further configured to use dispatchable distributed energy resources and an optimized control strategy to mitigate problems introduced by swings of real and reactive power.

54. The integrated microgrid management system according to claim 42, wherein the hardware operating as a node on the electrical power network comprises an electrical power SCADA system.

55. The integrated microgrid management system according to claim 42, wherein the hardware operating as a node on the electrical power network comprises a distributed energy management system.

56. The integrated microgrid management system according to claim 42, wherein the hardware operating as a node on the electrical power network comprises a distributed energy resource management system.

57. The integrated microgrid management system according to claim 42, wherein the microgrid is a grid-connected microgrid.

58. The integrated microgrid management system according to claim 42, wherein the microgrid is a standalone microgrid.

59. The integrated microgrid management system according to claim 42, wherein the processor is further configured to maintain real and reactive power balance within the microgrid for voltage and frequency stability by managing dispatchable and non-dispatchable generation, storage, and load resources.

60. The integrated microgrid management system according to claim 42, wherein the processor is further configured to utilize a library of applications corresponding to a plurality of different modes of microgrid operation.

61. The integrated microgrid management system according to claim 42, wherein the plurality of different modes of microgrid operation comprise Grid-islanded mode and Grid-connected mode.

62. The integrated microgrid management system according to claim 42, wherein the processor is further configured to manage grid-connected and grid-islanded states to connect or disconnect the microgrid from a main grid based on factors including price points and availability of the main grid.

63. An integrated microgrid management system, comprising:
hardware operating as a node on an electrical power network, the node comprising:
memory storing program code;
a communications channel operatively connected to a plurality of controllable power devices;
a physical processor configured to:
implement an optimization engine that is configured so as to perform local microgrid optimization and to contribute to optimization of an overall power grid; and, implement an online power flow engine that uses the output of the optimization engine to generate commands to control the plurality of controllable power devices.

64. The integrated microgrid management system according to claim 63, wherein the processor is further configured to utilize a library of engineering models of energy resources.

65. The integrated microgrid management system according to claim 64, wherein the energy resources comprise generation resources.

66. The integrated microgrid management system according to claim 65, wherein the generation resources comprise at least one selected from the set consisting of: tidal, solar, hydroelectric, fuel cell, wind, and A/C generator.

67. The integrated microgrid management system according to claim 64, wherein the energy resources comprise storage resources.

68. The integrated microgrid management system according to claim 67, wherein the storage resources comprise at least one selected from the set consisting of: battery, flywheel, fuel cell.

69. The integrated microgrid management system according to claim 64, wherein the energy resources comprise demand resources.

70. The integrated microgrid management system according to claim 69, wherein the demand resources comprise at least one selected from the set consisting of: electric vehicle, other dispatchable load.

71. The integrated microgrid management system according to claim 63, wherein the processor is further configured to implement a state estimator that computes system states.

72. The integrated microgrid management system according to claim 71, wherein the system states comprise at least one state selected from the set consisting of: voltages, currents, power, frequency and angles.

73. The integrated microgrid management system according to claim 63, wherein the processor is further configured to use dispatchable distributed energy resources and an optimized control strategy to mitigate problems introduced by swings of real and reactive power.

74. The integrated microgrid management system according to claim 63, wherein the hardware operating as a node on the electrical power network comprises an electrical power SCADA system.

75. The integrated microgrid management system according to claim 63, wherein the hardware operating as a node on the electrical power network comprises a distributed energy management system.

76. The integrated microgrid management system according to claim 63, wherein the hardware operating as a node on the electrical power network comprises a distributed energy resource management system.

77. The integrated microgrid management system according to claim 63, wherein the microgrid is a grid-connected microgrid.

78. The integrated microgrid management system according to claim 63, wherein the microgrid is a standalone microgrid.

79. The integrated microgrid management system according to claim 63, wherein the processor is further configured to maintain real and reactive power balance within the microgrid for voltage and frequency stability by managing dispatchable and non-dispatchable generation, storage, and load resources.

80. The integrated microgrid management system according to claim 63, wherein the processor is further configured to utilize a library of applications corresponding to a plurality of different modes of microgrid operation.

81. The integrated microgrid management system according to claim 63, wherein the plurality of different modes of microgrid operation comprise Grid-islanded mode and Grid-connected mode.

82. The integrated microgrid management system according to claim 63, wherein the processor is further configured to manage grid-connected and grid-islanded states to connect or disconnect the microgrid from a main grid based on factors including price points and availability of the main grid.

83. An integrated microgrid management system, comprising:
hardware operating as a node on an electrical power network, the node comprising:
memory storing program code;
a communications channel operatively connected to a plurality of controllable power devices at a first tier selected from the set consisting of: sub-premise, premise, community/sub-feeder, feeder, and substation;
a physical processor configured to:
implement an optimization engine that performs multi-objective optimization, said optimization engine optimizing objectives for said first tier and objectives for a second tier, the second tier being different than the first tier, the second tier being selected from the set consisting of: sub-premise, premise, community/sub-feeder, feeder, and substation; and,
implement an online power flow engine that uses the output of the optimization engine to generate commands to control the plurality of controllable power devices.

84. The integrated microgrid management system according to claim 83, wherein the processor is configured to implement an optimization engine that further aggregates and controls energy resource capacities of multiple microgrids, thereby creating a virtual power plant.

85. The integrated microgrid management system according to claim 83, wherein the processor is further configured to utilize a library of engineering models of energy resources.

86. The integrated microgrid management system according to claim 85, wherein the energy resources comprise generation resources.

87. The integrated microgrid management system according to claim 86, wherein the generation resources comprise at least one selected from the set consisting of: tidal, solar, hydroelectric, fuel cell, wind, and A/C generator.

88. The integrated microgrid management system according to claim 85, wherein the energy resources comprise storage resources.

89. The integrated microgrid management system according to claim 88, wherein the storage resources comprise at least one selected from the set consisting of: battery, flywheel, fuel cell.

90. The integrated microgrid management system according to claim 85, wherein the energy resources comprise demand resources.

91. The integrated microgrid management system according to claim 90, wherein the demand resources comprise at least one selected from the set consisting of: electric vehicle, other dispatchable load.

92. The integrated microgrid management system according to claim 83, wherein the processor is further configured to implement a state estimator that computes system states.

93. The integrated microgrid management system according to claim 92, wherein the system states comprise at least one state selected from the set consisting of: voltages, currents, power, frequency and angles.

94. The integrated microgrid management system according to claim 83, wherein the processor is further configured to use dispatchable distributed energy resources and an optimized control strategy to mitigate problems introduced by swings of real and reactive power.

95. The integrated microgrid management system according to claim 83, wherein the hardware operating as a node on the electrical power network comprises an electrical power SCADA system.

96. The integrated microgrid management system according to claim 83, wherein the hardware operating as a node on the electrical power network comprises a distributed energy management system.

97. The integrated microgrid management system according to claim 83, wherein the hardware operating as a node on the electrical power network comprises a distributed energy resource management system.

98. The integrated microgrid management system according to claim 83, wherein the microgrid is a grid-connected microgrid.

99. The integrated microgrid management system according to claim 83, wherein the microgrid is a standalone microgrid.

100. The integrated microgrid management system according to claim 83, wherein the processor is further configured to maintain real and reactive power balance within the microgrid for voltage and frequency stability by managing dispatchable and non-dispatchable generation, storage, and load resources.

101. The integrated microgrid management system according to claim 83, wherein the processor is further configured to utilize a library of applications corresponding to a plurality of different modes of microgrid operation.

102. The integrated microgrid management system according to claim 101, wherein the plurality of different modes of microgrid operation comprise Grid-islanded mode and Grid-connected mode.

103. The integrated microgrid management system according to claim 83, wherein the processor is further configured to manage grid-connected and grid-islanded states to connect or disconnect the microgrid from a main grid based on factors including price points and availability of the main grid.

104. An integrated microgrid management system, comprising:
hardware operating as a node on an electrical power network, the node comprising:
memory storing program code;
a communications channel operatively connected to a plurality of controllable power devices;
a physical processor configured to:
implement adaptive self-configuration logic that:
determines a first operating configuration of boundaries the microgrid;
determines that predetermined criteria have been met and, based on said determination, determines a reconfiguration of boundaries of the microgrid, the reconfiguration being a second operating configuration that differs from the first operating configuration;
generates commands to control the plurality of controllable power devices so as to reconfigure boundaries of the microgrid in accordance with the second operating configuration.

105. The integrated microgrid management system according to claim 104, wherein the first operating configuration comprises a first tier type and the second operating configuration comprises a second tier type, the second tier type being different than the first tier type.

106. The integrated microgrid management system according to claim 104, wherein the criteria comprises a threshold.

107. The integrated microgrid management system according to claim 104, wherein the criteria comprises an event.

108. The integrated microgrid management system according to claim 104, wherein the event comprises a fault.

109. The integrated microgrid management system according to claim 104, wherein the criteria comprises an optimization parameter.

110. The integrated microgrid management system according to claim 104, wherein the first operating configuration comprises a non-embedded microgrid configuration and the second operating configuration comprises an embedded microgrid configuration.

111. The integrated microgrid management system according to claim 104, wherein the first operating configuration comprises a non-overlapping microgrid configuration and the second operating configuration comprises an overlapping microgrid configuration.

112. An integrated microgrid management system, comprising:
hardware operating as a node on an electrical power network, the node comprising:
memory storing program code;
a communications channel operatively connected to a plurality of controllable power devices;
a physical processor configured to:
implement a three-phase AC unbalanced model of a microgrid network, for both low and medium voltage networks; and,
implement an online power flow engine that uses the three-phase AC unbalanced model of the network to generate commands to control the plurality of controllable power devices.

113. An integrated microgrid management system, comprising:
hardware operating as a node on an electrical power network, the node comprising:
memory storing program code;
a communications channel operatively connected to a plurality of controllable power devices;
a physical processor configured to:
implement a topology processor that creates a map identifying controllable power devices that are connected to the network and how said controllable power devices are connected; and,
implement an online power flow engine that uses the map to generate commands to control the plurality of controllable power devices.

* * * * *